(12) United States Patent
Yasukawa et al.

(10) Patent No.: US 10,912,095 B2
(45) Date of Patent: Feb. 2, 2021

(54) USER EQUIPMENT

(71) Applicant: NTT DOCOMO, INC., Tokyo (JP)

(72) Inventors: Shinpei Yasukawa, Tokyo (JP); Satoshi Nagata, Tokyo (JP); Huan Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/647,394

(22) PCT Filed: Sep. 19, 2017

(86) PCT No.: PCT/JP2017/033771
§ 371 (c)(1),
(2) Date: Mar. 13, 2020

(87) PCT Pub. No.: WO2019/058435
PCT Pub. Date: Mar. 28, 2019

(65) Prior Publication Data
US 2020/0221440 A1 Jul. 9, 2020

(51) Int. Cl.
*H04W 72/04* (2009.01)
*H04W 4/46* (2018.01)
*H04B 7/06* (2006.01)
*H04B 7/08* (2006.01)

(52) U.S. Cl.
CPC ........ *H04W 72/046* (2013.01); *H04B 7/0617* (2013.01); *H04B 7/086* (2013.01); *H04W 4/46* (2018.02); *H04W 72/0406* (2013.01)

(58) Field of Classification Search
CPC . H04W 72/046; H04W 4/46; H04W 72/0406; H04B 7/0617; H04B 7/086; H04B 7/0695; H04L 5/00
See application file for complete search history.

(56) References Cited

U.S. PATENT DOCUMENTS

| 2019/0059071 A1* | 2/2019 | Khoryaev | H04W 64/006 |
| 2019/0327751 A1* | 10/2019 | Dong | H04L 5/0044 |
| 2020/0213054 A1* | 7/2020 | Park | H04B 7/0639 |
| 2020/0213064 A1* | 7/2020 | Takaoka | H04W 48/00 |

(Continued)

OTHER PUBLICATIONS

International Search Report issued in PCT/JP2017/033771 dated Dec. 12, 2017 (3 pages).

(Continued)

*Primary Examiner* — Jean B Corrielus
(74) *Attorney, Agent, or Firm* — Osha Bergman Watanabe & Burton LLP

(57) ABSTRACT

A user equipment performs communication using beamforming with another user equipment, the user equipment including a control unit configured to configure, in at least one beam among a plurality of beams, information indicating positions of all of resources in a radio frame, the plurality of beams being transmitted via corresponding resources; and a transmitting unit configured to transmit the plurality of beams using all of the resources, by applying beam switching or beam repetition, wherein the positions of all of the resources in the radio frame correspond to a position of a resource to be decoded and a position to be used for excluding a transmission resource candidate.

6 Claims, 20 Drawing Sheets

(56) References Cited

U.S. PATENT DOCUMENTS

2020/0267710 A1* 8/2020 Zhang .................. H04L 5/0046

OTHER PUBLICATIONS

Witten Opinion of the International Searching Authority issued in PCT/JP2017/033771 dated Dec. 12, 2017 (3 pages).
3GPP TS 36.213 V14.3.0; "3rd Generation Partnership Project; Technical Specification Group Radio Access Network; Evolved Universal Terrestrial Radio Access (E-UTRA); Physical layer procedures (Release 14)" Jun. 2017 (460 pages).
3GPP TS 36.211 V14.3.0; "3rd Generation Partnership Project; Technical Specification Group Radio Access Network; Evolved Universal Terrestrial Radio Access (E-UTRA); Physical channels and modulation (Release 14)"; Jun. 2017 (195 pages).

* cited by examiner

FIG.2
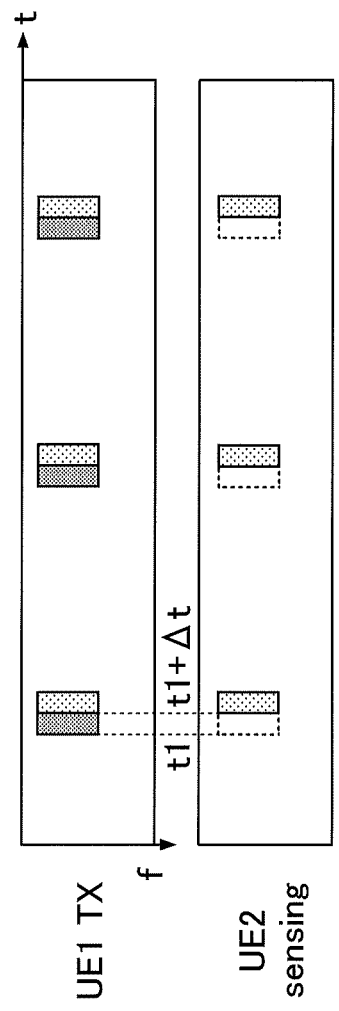
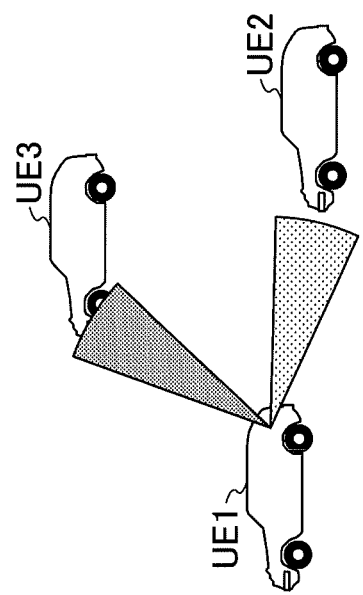

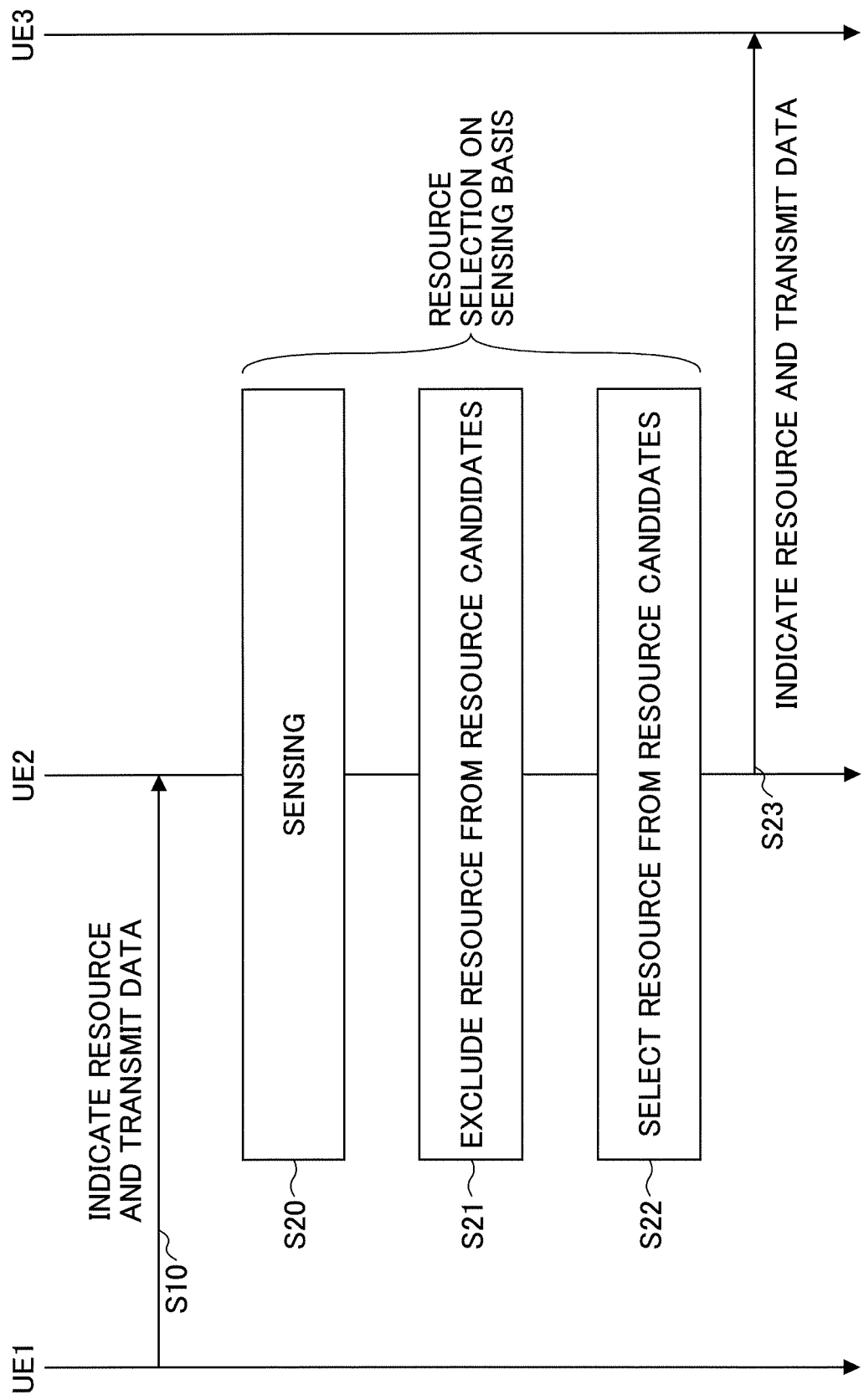

FIG.5
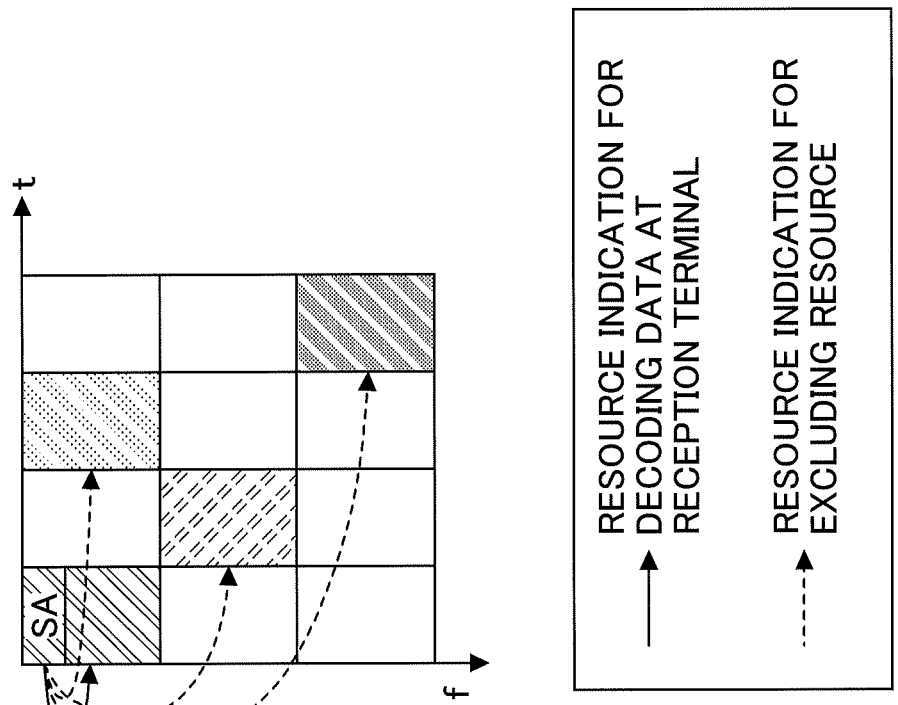
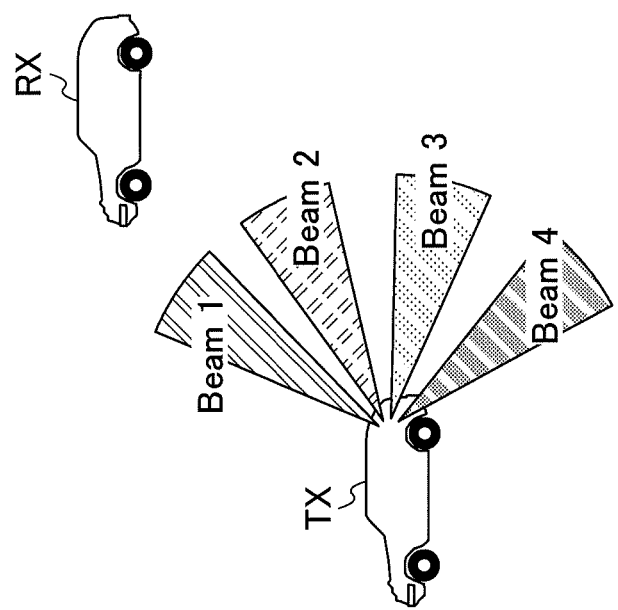

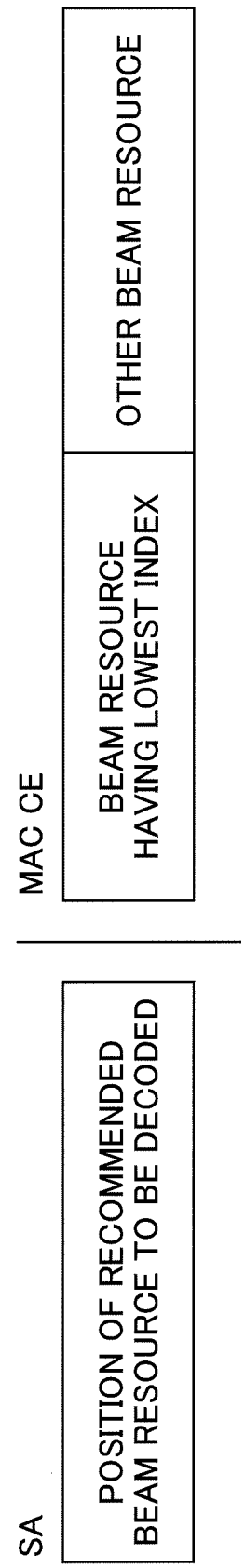

(x = 5, y = 3, k = 1, bitmap size = 15)

(x = 5, y = 3, k = 1, bitmap size = 10)

FIG.8

| | FEATURE 1 | FEATURE 2 |
|---|---|---|
| FIG. 6A | FLEXIBILITY OF RESOURCE SELECTION IS HIGH | SIGNALING OVERHEAD IS HIGH |
| FIG. 6B | FLEXIBILITY OF RESOURCE SELECTION IS HIGH | SIGNALING OVERHEAD IS LOWER THAN FIG. 6A |
| FIG. 7A, FIG. 7B | ONLY REGION COVERED BY BITMAP IS INDICATED, AND, THEREFORE, FLEXIBILITY OF RESOURCE SELECTION IS LIMITED | SIGNALING OVERHEAD IS LOWER THAN FIG. 6B |

FIG.14

|  | FEATURE 1 | FEATURE 2 |
|---|---|---|
| FIG. 10 | FLEXIBILITY OF RESOURCE SELECTION IS HIGH | SIGNALING OVERHEAD IS HIGH |
| FIG. 11 | FLEXIBILITY OF RESOURCE SELECTION IS LIMITED | SIGNALING OVERHEAD IS LOWER THAN FIG. 10 |
| FIG. 12, FIG. 13 | FLEXIBILITY OF RESOURCE SELECTION IS LIMITED | RESOURCE INDICATION RELATING TO TIME DOMAIN DECREASES, AND, THEREFORE, SIGNALING OVERHEAD IS LOWER THAN FIG. 11 |

USER EQUIPMENT

TECHNICAL FIELD

The present invention relates to a user equipment in a radio communication system.

BACKGROUND ART

In LTE (Long Term Evolution) and the successor system of LTE (for example, LTE-A (LTE Advanced), NR (New Radio) (also referred to as 5G)), a D2D (Device to Device) technique, in which user equipments communicate directly without involving a radio base station, has been studied.

D2D reduces the traffic between the user equipment and the base station apparatus, and enables communication between the user equipments even when the base station apparatus becomes unable to communicate in the event of a disaster, etc.

D2D is roughly divided into D2D discovery for finding other communicable user equipments, and D2D communication for performing direct communication between user equipments (also referred to as D2D direct communication, D2D communication, inter-terminal direct communication, etc.). In the following, when D2D communication and D2D discovery, etc., are not distinguished from each other, each of these techniques is simply referred to as D2D. Furthermore, signals transmitted and received by D2D are referred to as D2D signals.

Note that in 3GPP (3rd Generation Partnership Project), D2D is referred to as "sidelink"; however, in the present specification, D2D, which is a more general term, is used. However, sidelink is also used as necessary in the description of the embodiment to be described later.

Furthermore, in 3GPP, studies are being made to realize V2X (Vehicle to Everything) by extending the above D2D function, and specifications of V2X are being made. Here, V2X is a part of ITS (Intelligent Transport Systems), and as illustrated in FIG. 1B, V2X is a collective term of V2V (Vehicle to Vehicle) meaning a communication mode implemented between vehicles, V2I (Vehicle to Infrastructure) meaning a communication mode implemented between a vehicle and a road-side unit (RSU) installed at the side of a road, V2N (Vehicle to Nomadic device) meaning a communication mode implemented between a vehicle and a mobile terminal of a driver), and V2P (Vehicle to Pedestrian) meaning a communication mode implemented between a vehicle and a mobile terminal of a pedestrian.

In Rel-14 of LTE, specifications on several functions of V2X have been made (for example, Non-Patent Literature 1). In these specifications, Mode 3 and Mode 4 are defined with respect to resource allocation for V2X communication to the user equipment. In Mode 3, transmission resources are allocated dynamically by DCI (Downlink Control Information) sent from the base station apparatus to the user equipment. Furthermore, in Mode 3, SPS (Semi Persistent Scheduling) is also possible. In Mode 4, the user equipment autonomously selects a transmission resource from the resource pool.

Furthermore, in D2D in NR, it is assumed that a wide frequency band, ranging from a low frequency band similar to LTE to a higher frequency band (millimeter wave band) than LTE, is used. Particularly, in the high frequency band, the propagation loss increases, and, therefore, in order to compensate for the propagation loss, the application of beamforming with a narrow beam width has been studied (for example, Non-Patent Literature 2).

CITATION LIST

Non-Patent Literature

[Non-Patent Literature 1] 3GPP TS 36.213 V14.3.0 (2017-06)
[Non-Patent Literature 2] 3GPP TS 36.311 V14.3.0 (2017-06)

SUMMARY OF INVENTION

Technical Problem

In D2D, when the user equipment on the transmitting side applies beamforming, at the user equipment on the receiving side in a direction other than the direction in which the beam is directed, the reception power of the beams drops, and detection becomes difficult. Furthermore, the beams in the high frequency band have high rectilinearity, and there is a large loss due to shielding objects, and, therefore, for example, in V2X, depending on the position of the vehicle, the beams are blocked by other vehicles, the reception power is lowered at the user equipment on the receiving side, and detection becomes difficult. In this way, there is a possibility that there will be an undetected hidden node, and when another user equipment uses a resource used by the hidden node, problems occur such as resource collision and the communication becoming half duplex.

The present invention has been made in view of the above problems, and it is an object of the present invention to enable a user equipment performing transmission by applying beamforming in D2D, to appropriately select a resource to be used.

Solution to Problem

According to the disclosed technology, there is provided a user equipment for performing communication using beamforming with another user equipment, the user equipment including a control unit configured to configure, in at least one beam among a plurality of beams, information indicating positions of all of resources in a radio frame, the plurality of beams being transmitted via corresponding resources; and a transmitting unit configured to transmit the plurality of beams using all of the resources, by applying beam switching or beam repetition, wherein the positions of all of the resources in the radio frame correspond to a position of a resource to be decoded and a position to be used for excluding a transmission resource candidate.

Advantageous Effects of Invention

According to the disclosed technology, there is provided a technique that enables a user equipment performing transmission by applying beamforming in D2D, to appropriately select a resource to be used.

BRIEF DESCRIPTION OF DRAWINGS

FIG. 2 is a diagram illustrating an example of a sensing operation by a user equipment 100.

FIG. 4 is a diagram illustrating an example of a communication sequence by the user equipment 100 according to an embodiment of the present invention.

FIG. 5 is a diagram illustrating an example (1) of a resource indication (report) according to the embodiment of the present invention.

FIG. 6B is a diagram illustrating an example (2-2) of a resource indication (report) according to the embodiment of the present invention.

FIG. 8 is a diagram for describing features of a resource indicating (reporting) method according to an embodiment of the present invention.

FIG. 14 is a diagram for describing features of a resource indicating (reporting) method according to an embodiment of the present invention.

DESCRIPTION OF EMBODIMENT

Hereinafter, an embodiment of the present invention will be described with reference to the drawings. Note that the embodiment described below is merely an example, and embodiments to which the present invention is applied are not limited to the following embodiment.

In the operation of the radio communication system according to the present embodiment, the existing technology is appropriately used. The existing technology is, for example, existing LTE; however, the existing technology is not limited to existing LTE. Furthermore, the term "LTE" used in the present specification shall have a broad meaning including LTE-Advanced and methods after LTE-Advanced (e.g., NR) unless otherwise specified.

Figure 1A:
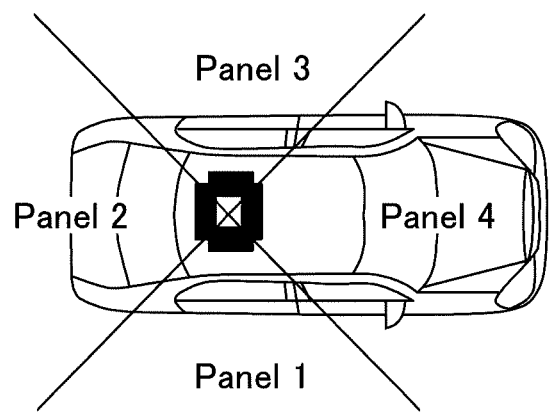
FIG. 1A is a diagram illustrating a configuration example of an antenna installed in a user equipment 100.
Figure 1B:
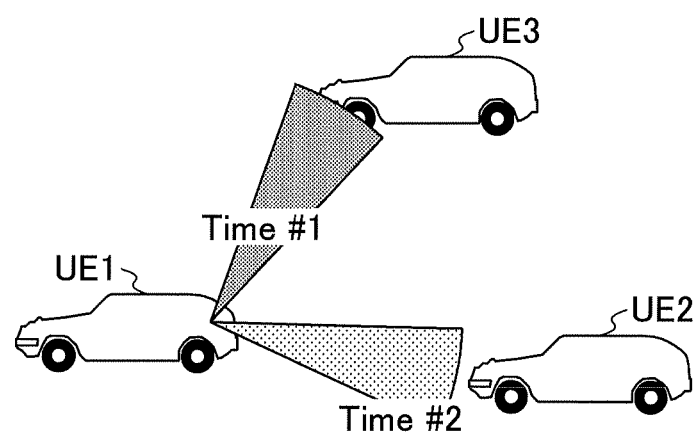
FIG. 1B is a diagram illustrating an example in which the user equipment 100 applies different beams in a time division manner and performs transmission.
Figure 1C:
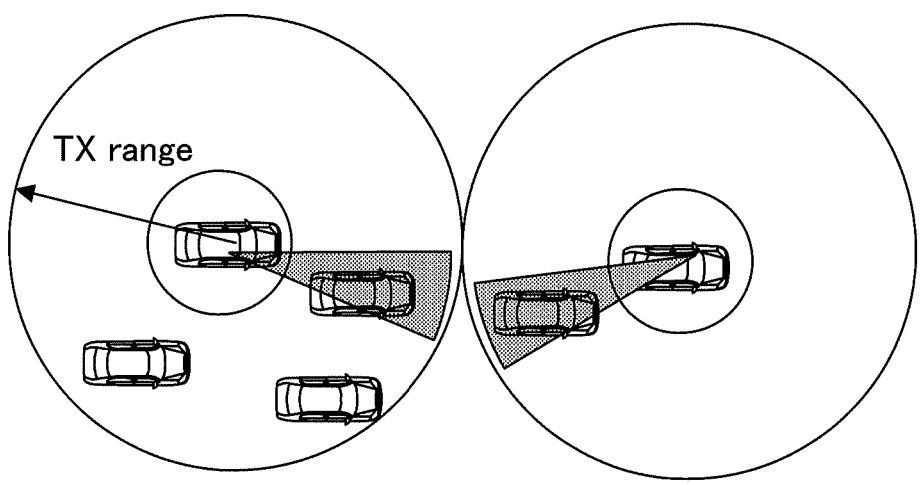
FIG. 1C is a diagram illustrating a transmission range of the user equipment 100.

FIGS. 1A, 1B, and 1C are diagrams illustrating a configuration example of a radio communication system according to the embodiment of the present invention. A radio communication system according to the embodiment of the present invention includes a plurality of user equipments 100, as illustrated in FIG. 1B or FIG. 1C. Although FIG. 1B illustrates three user equipments 100, this is an example, and there may be more user equipments 100. Hereinafter, the user equipment 100 is also referred to as "UE (User Entity)". The user equipment 100 is a communication apparatus having a radio communication function, such as a smartphone, a mobile phone, a tablet, a wearable terminal, a communication module for M2M (Machine-to-Machine), etc., and is wirelessly connected to a base station apparatus or another user equipment 100, and uses various communication services provided by the radio communication system. The user equipment 100 is capable of beamforming and transmitting/receiving signals. According to the embodiment of the present invention, a communication apparatus installed in a vehicle in V2X is mainly assumed.

Note that in the present embodiment, the duplex method may be the TDD (Time Division Duplex) method, the FDD (Frequency Division Duplex) method, or other methods (for example, the Flexible Duplex method). Furthermore, in the following description, transmitting a signal using a transmission beam may be transmitting a signal multiplied by a precoding vector (precoded with a precoding vector). Similarly, receiving a signal using a reception beam may be performed by multiplying the received signal by a predetermined weight vector. Furthermore, transmitting a signal using a transmission beam may be expressed as transmitting a signal by a specific antenna port. Similarly, receiving a signal using a reception beam may be expressed as receiving a signal by specific antenna port. The antenna port refers to a logical antenna port or a physical antenna port defined by the 3GPP standard. Note that the method of forming a transmission beam and a reception beam is not limited to the above method. For example, in the user equipment 100 having a plurality of antennas, a method of changing the angle of each antenna may be used, or a method using a combination of a method of using a precoding vector and a method of changing the angle of the antenna may be used, a method of switching between different antenna panels may be used, a method of combining a plurality of antenna panels may be used, or another method may be used. Furthermore, for example, in the high frequency band, a plurality of mutually different transmission beams may be used. Using a plurality of transmission beams is referred to as a multi-beam operation, and using one transmission beam is referred to as a single beam operation.

FIG. 1A is a diagram illustrating a configuration example of an antenna installed in the user equipment 100. Antenna panels Panel 1 to Panel 4 are installed in the front, rear, left, and right directions of the vehicle, respectively, and function as transmitting and receiving antennas in the millimeter wave band.

FIG. 1B is a diagram illustrating an example in which the user equipment 100 applies different beams in a time division manner and transmits beams. At the time Time #1, the beams are transmitted toward the UE3, and at the time Time #2, the beams transmitted toward the UE2.

FIG. 1C is a diagram illustrating a transmission range of the user equipment 100. The range indicated by "TX range" in the figure is the communication range that is the target of V2X in the present embodiment. For example, it is assumed that the communication range is within a radius of approximately several hundred meters centering around the vehicle.

According to the embodiment of the present invention, it is assumed that the user equipment 100 performs broadcasting in the millimeter wave band. Broadcasting may be performed by transmission involving beam switching of switching beams at every unit time, or repetitive beam transmission. Furthermore, it is assumed that periodic or quasi-periodic communication traffic occurs in the user equipment 100. Furthermore, as defined in Release 14 of 3GPP, it is assumed that the user equipment 100 basically performs autonomous resource selection by sensing resources, and it is possible to perform background sensing and to secure transmission resources.

In consideration of the gain factor and the loss factor, the user equipment 100 performs data transmission by applying beam switching in the millimeter wave band. A multi-panel antenna directed in different directions as illustrated in FIG. 1A, is used for transmitting and receiving millimeter waves. Furthermore, it is assumed that there is a problem that the communication between the user equipments 100 becomes HD (Half Duplex) due to resource collision (details will be described later).

FIG. 2 is a diagram illustrating an example of a sensing operation by the user equipment 100. The user equipment 100 transmits a narrow beam using different resources, to neighboring user equipments 100. The neighboring user equipment 100 can detect only the beams directed to itself. On the other hand, the neighboring user equipment 100 cannot detect beams directed to other user equipments 100. Therefore, a problem of hidden nodes caused by beamforming arises.

As illustrated in FIG. 2, the UE1 transmits a beam toward the UE3 at time t1, and transmits a beam toward the UE2 at time t1+Δt. Here, the transmission beam of the UE1 at the time t1 is directed to the UE3, and, therefore, the UE2 cannot detect that the UE1 is transmitting a beam at the time t1. As indicated by "UE2 sensing" of FIG. 2, the UE2 detects that the resource is unused at the time t1; however, actually, the UE1 is using the resource, and, therefore, when the UE2 selects the resource being used by the UE1, resource collision will occur.

Figure 3A:
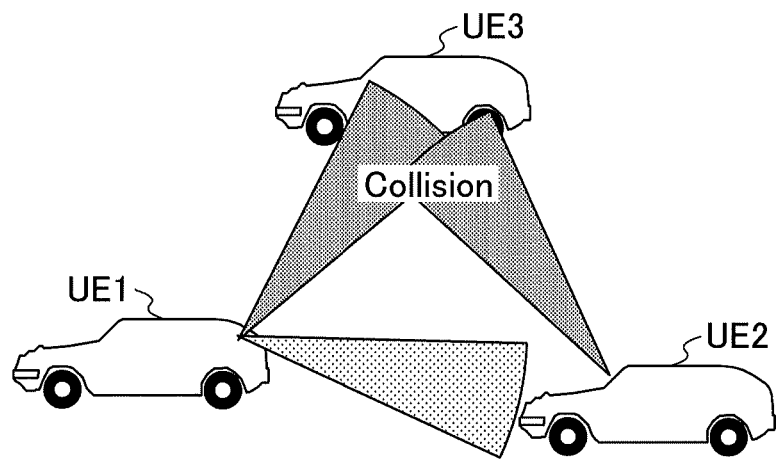
FIG. 3A is a diagram illustrating an example of resource collision at the time of transmission by the user equipment 100.

FIG. 3A is a diagram illustrating an example of resource collision at the time of transmission by the user equipment 100. Resource collision may occur due to hidden nodes caused by beamforming.

As illustrated in FIG. 3A, when the UE1 is transmitting a beam toward the UE3, the UE2 cannot detect the beam, so there will be a possibility that the UE2 selects the same resource as the transmitted beam and transmits a beam to UE3. When the same resource is selected, resource collision occurs. That is, the UE2 cannot detect the transmission by the UE1 due to beamforming, and, therefore, a phenomenon in which the UE1 becomes a hidden node will occur.

Figure 3B:
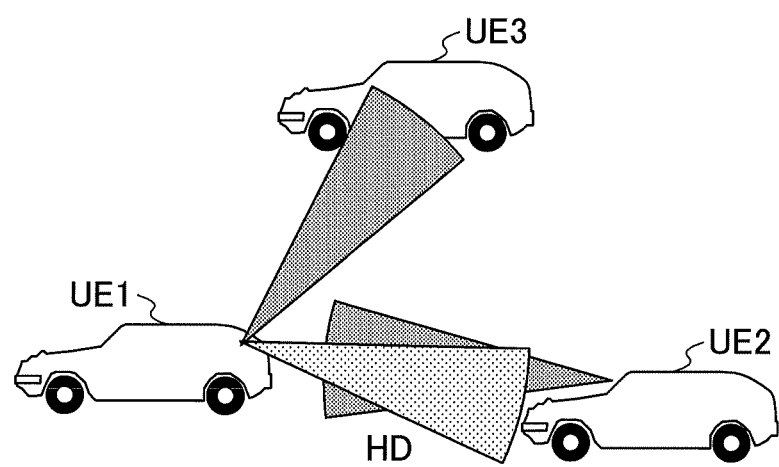
FIG. 3B is a diagram illustrating an example in which an HD problem occurs at the time of transmission by the user equipment 100.

FIG. 3B is a diagram illustrating an example in which the HD problem occurs at the time of transmission by the user equipment 100. As illustrated in FIG. 3B, when the UE1 is transmitting a beam directed to the UE3, the UE2 cannot detect the transmitted beam, and, therefore, there will be a possibility that the UE2 selects the same resource as the transmitted beam and transmits a beam to the UE1. When the same resource is selected, resource collision occurs, and the communication between the UE1 and the UE2 becomes HD. That is, the UE2 cannot detect the transmission by the UE1 due to beamforming, and, therefore, a phenomenon in which the UE1 becomes a hidden node will occur.

EMBODIMENTS

Embodiments will be described below.

FIG. 4 is a diagram illustrating an example of a communication sequence by the user equipment 100 according to the embodiment of the present invention. As a countermeasure to the hidden node problem caused by the beamforming as described above, a conceivable method would be to report (indicate), to the neighboring user equipment 100, the resource to be used for data transmission, in order to support sensing. The user equipment 100 broadcasts the data to neighboring user equipments 100 by using a plurality of beams. A beam resource is selected, independently of or dependent on the plurality of beams. Here, a resource is a region in a radio frame defined by one subchannel and TTI, and a beam resource is a set of resources for transmitting packets by beams. Each beam resource corresponds to one transmitted beam, and the size of the beam resource may be common among the beams. The user equipment 100 performing data transmission is configured or predefined so as to report (indicate) all of the beam resources occupied by the data transmission. The beam resource may include information of the frequency resource. Based on this information, more efficient sensing becomes possible. The report (indication) may be made via control signals of the physical layer, or may be made via upper layer signaling such as MAC-CE/Data (Media Access Control-Control Element/Data). Upon receiving a beam from another user equipment 100, the user equipment 100 decodes the data included in the beam. Furthermore, the user equipment 100 selects a resource based on sensing as described below.

1) Exclusion of resources from resource candidates based on RSRP (Reference Signal Received Power) or RSSI (Reception Signal Strength Indicator), is configured or predefined.

2) Measurement of RSRP and/or RSSI is configured or predefined to be executed with respect to SA (Scheduling Assignment) and/or data.

3) Measurement rules of RSRP and/or RSSI are configured or predefined.

4) If the RSRP and/or RSSI of a resource is less than a configured or predefined threshold, the resource becomes a resource candidate.

5) Selection of a resource from resource candidates that have not been excluded. The resource selection may be executed at random, for example.

FIG. 4 illustrates a sequence in which the UE1 transmits information to the UE2, the UE2 performs sensing on the transmitted information and selects a resource, and the UE2 transmits information to the UE3.

In step S10, the UE1 transmits an indication (report) of the resource and data to the UE2. Subsequently, in step S20, the UE2 performs sensing. In the sensing, for example, RSRP or RSSI of signals transmitted from UE1 in step S10 is measured, and the resource indication (report) included in the signals transmitted from the UE1 is acquired. Subsequently, resources are excluded from resource candidates to be used for data communication, based on the result of sensing performed in step S20. For example, if the result of measuring the RSRP or the RSSI of the signals transmitted from the UE1 in step S10 exceeds a predetermined threshold value, the corresponding resource may be excluded, or a resource indicated in the resource report (indication) included in the signals may be excluded.

In step S22, the UE2 selects a resource to be used for data communication, from the resource candidates that have not been excluded in step S23. The operation of resource selection on the basis of sensing starts from the sensing in step S20 to the selection of a resource from the resource candidates in step S22. Subsequently, in step S23, the UE2 transmits data to the UE3 by using the resource selected in step S22, and transmits a resource report (indication) to the UE3. Furthermore, in step S23, the UE2 may perform transmission by applying beam repetition. By such a transmission, the reach range of the beam is expanded, and the UE3 can perform sensing in a relatively wide range.

FIG. 5 is a diagram illustrating an example (1) of a resource report (indication) according to the embodiment of the present invention. The beam resource may be selected independently from among the set of resources. The maximum number of beam resources is predefined, configured, or indicated (reported). A resource arrangement field included in the resource report (indication) is for indicating the beam resource, and this field is included in SA or upper layer signaling. Here, a recommended beam resource is a beam resource which is decoded separately from other beam resources, in the user equipment 100 on the receiving side, and may further include a beam resource of another beam whose direction is close to that of the beam of the beam resource to be decoded.

As a method of indicating (reporting) a resource from the user equipment 100 on the transmitting side to the user equipment 100 on the receiving side, there are methods as illustrated in FIGS. 5, 6, and 7. In the resource indicating (reporting) method illustrated in FIG. 5, the user equipment 100 on the receiving side decodes SA or upper layer signaling including the resource report (indication), identifies the recommended beam resource to be decoded including data, and identifies the resource to be excluded from the resource candidates. Whether or not soft combining is to be performed at the time of reception, depends on the implementation of the user equipment 100.

For example, as illustrated in FIG. 5, the user equipment 100 on the transmitting side transmits Beam 1 to Beam 4. For the user equipment 100 on the receiving side, Beam 1 has the best reception condition. Upon receiving Beam 1, the user equipment 100 on the receiving side decodes and acquires SA including the resource report (indication). As illustrated in FIG. 5, SA or upper layer signaling included in the resource report (indication) includes information indicating the resource to be decoded and the resource to be excluded from the resource candidates. The index of each region partitioned for each beam resource of the radio frame illustrated in FIG. 5, is set as t1, t2, t3, t4 in the time domain, and f1, f2, f3 in the frequency domain. The recommended resource to be decoded is the beam resource indicated by t1 and f1. As resources to be excluded from the resource candidates, there are three resources, i.e., the beam resource indicated by t2 and f2, the beam resource indicated by t3 and f1, and the beam resource indicated by t4 and f3.

Figure 6A:
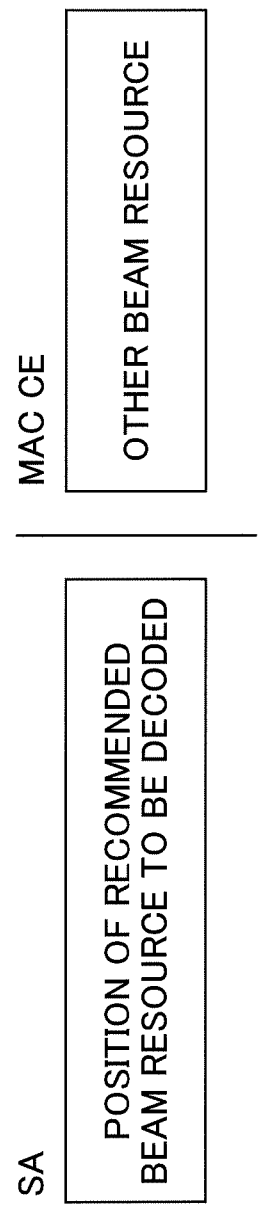
FIG. 6A is a diagram illustrating an example (2-1) of a resource indication (report) according to the embodiment of the present invention.

FIG. 6A is a diagram illustrating an example (2-1) of a resource report (indication) according to the embodiment of the present invention. In FIG. 6A, a plurality of beam resource arrangement fields includes the absolute positions of all of the beam resources. The recommended beam resource is indicated (reported) to the user equipment 100 on the receiving side by SA and is decoded. All beam resources except for the recommended beam resource, are indicated (reported) to the user equipment 100 on the receiving side via SA or upper layer signaling. The maximum number of resource arrangement fields included in SA may be predefined. The maximum number of fields included in the upper layer signaling may be predefined, configured, or indicated (reported).

In the example illustrated in FIG. 6A, SA includes a field indicating the position of the recommended beam resource to be decoded. On the other hand, the MAC-CE which is an example of the upper layer signaling, includes a field indicating other beam resources.

FIG. 6B is a diagram illustrating an example (2-2) of a resource report (indication) according to the embodiment of the present invention. In FIG. 6B, a plurality of beam resource arrangement fields includes one or more fields including the absolute positions of beam resources, and other fields including offset values from the beam resources for which the absolute positions have been indicated (reported). The absolute position of the recommended beam resource is indicated (reported) by SA, to the user equipment 100 on the receiving side. The absolute position of the beam resource with the lowest time domain index and frequency domain index, is indicated (reported) by upper layer signaling or SA. The offset values related to the positions of other beam resources, are indicated (reported) by upper layer signaling or SA.

In the example illustrated in FIG. 6B, SA includes a field indicating the absolute position of the recommended beam resource to be decoded. On the other hand, MAC-CE, which is an example of upper layer signaling, includes a field indicating the absolute position of a beam resource having the lowest index and a field indicating other beam resources by offset values.

Figure 7A:
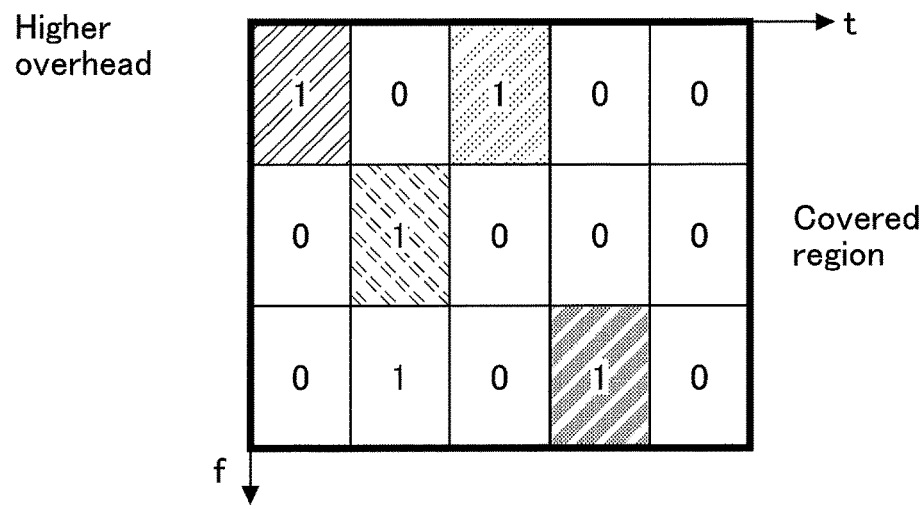
FIG. 7A is a diagram illustrating an example (3-1) of a resource indication (report) according to the embodiment of the present invention.

FIG. 7A is a diagram illustrating an example (3-1) of a resource indication (report) according to the embodiment of the present invention. One or more beam resource arrangement fields include the absolute positions of one or more beam resources. A bitmap is used to indicate the position of the beam resource. The absolute position of the recommended beam resource is indicated (reported) by SA to the user equipment 100 on the receiving side. A bitmap is indicated (reported) by upper layer signaling or SA. The unit of bitmap is configured or predefined. The unit of the bitmap may be, for example, the same as the size of the beam resource. The region covered by the bitmap is configured or predefined. For example, the region may be configured to have a size of x units in the time domain and y units in the frequency domain. Furthermore, the region may start from a beam resource with the lowest index in the frequency domain and time domain. The size of the bitmap is determined according to the region covered by the bitmap and the encoding method. The recommended beam resource to be decoded in the user equipment 100 on the receiving side may be marked with additional bits in upper layer signaling or SA. That is, it may be indicated (reported) that the "k" th beam resource in the bitmap is to be decoded by the user equipment 100 on the receiving side. The marking is used by the user equipment 100 on the receiving side to recognize the absolute position of the region covered by the bitmap, among time-frequency resources.

Figure 7B:
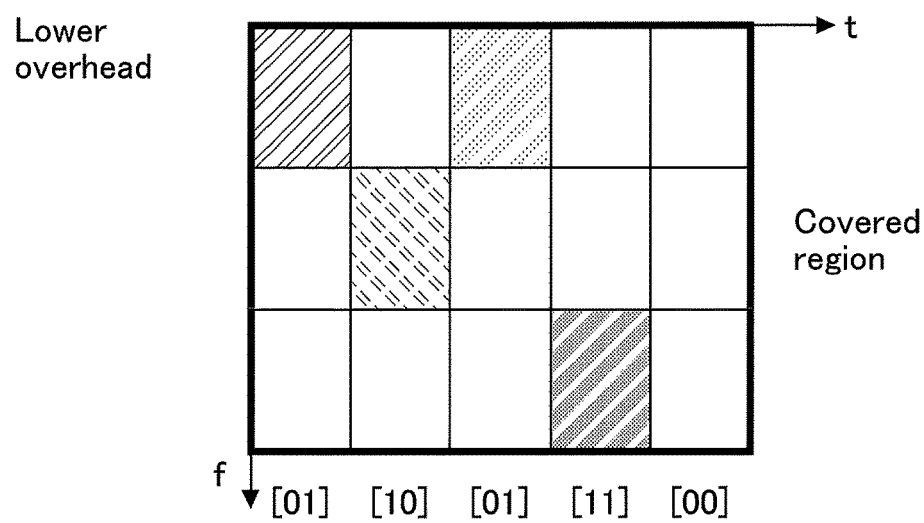
FIG. 7B is a diagram illustrating an example (3-2) of a resource indication (report) according to the embodiment of the present invention.

FIG. 7A illustrates a report (indication) example in which the overhead becomes high as compared with FIG. 7B. The parameters of the bitmap are x=5, y=3, k=1, and the bitmap size=15.

In FIG. 7A, a bit stream, in which the time index is mapped first and the frequency index is mapped next, is defined. The bit stream output in FIG. 7A is 15 bits of [10100; 01000; 01010].

FIG. 7B is a diagram illustrating an example (3-2) of a resource indication (report) according to the embodiment of the present invention. FIG. 7B illustrates a report (indication) example in which the overhead is low as compared with FIG. 7A. The parameters of the bitmap are x=5, y=3, k=1, and bitmap size=10.

In FIG. 7B, for each TTI, the bits for mapping the state of the beam resource, are defined. For example, 2 bits are allocated to 1 TTI, and when it is defined that 00: resource is not used, 01: resource with the lowest frequency index is used, 10: resource with the second lowest frequency index is used, 11: resource with the third lowest frequency index is used, the bit stream output in FIG. 7B will be 10 bits of [01; 10; 01; 11; 00].

FIG. 8 is a diagram for describing features of the resource indicating (reporting) methods according to the embodiment of the present invention. As illustrated in FIG. 8, the resource indication (reporting) method illustrated in FIG. 6A has the feature that the flexibility of resource selection is high and the signaling overhead is high. The resource indication (reporting) method illustrated in FIG. 6B has the feature that the flexibility of resource selection is high, and when compared with the resource indication (reporting) method illustrated in FIG. 6A, the signaling overhead is low. In the indication (reporting) methods illustrated in FIG. 7A or 7B, only the region covered by the bitmap is indicated (reported), and, therefore, the flexibility of resource selection is limited, and the signaling overhead is lower than FIG. 6B.

Figure 9:
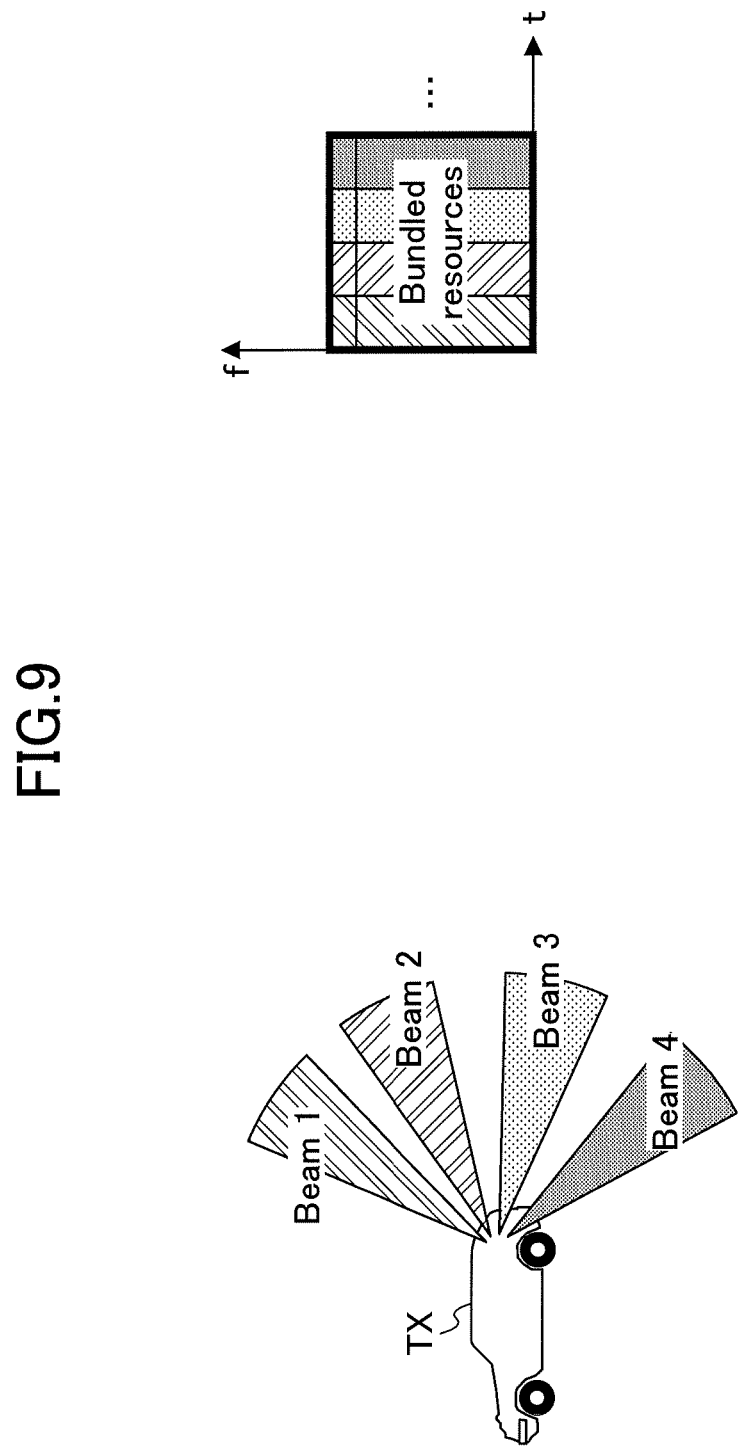
FIG. 9 is a diagram illustrating an example (4) of a resource indication (report) according to the embodiment of the present invention.

FIG. 9 is a diagram illustrating an example (4) of a resource indication (report) according to the embodiment of the present invention. The beam resources included in the resource indication (report) are configured or predefined to be continuously bundled in the time domain. The maximum number of bundled beam resources may be predefined, configured, or indicated (reported). The resource arrangement field indicates (reports) the bundled beam resources. This field is included in SA or upper layer signaling. The recommended beam resource is identified from the bundled beam resources, and is decoded by the user equipment 100 on the receiving side.

As methods of indicating (reporting) the resource from the user equipment 100 on the transmitting side performing the bundling of beam resources, to the user equipment 100 on the receiving side, there are methods as illustrated in FIGS. 9 to 13. In the resource indicating (reporting) method illustrated in FIG. 9, the user equipment 100 on the receiving side decodes SA or the upper layer signaling including the resource indication (report), identifies the recommended beam resource to be decoded including the data, and identifies the resource to be excluded from the resource candidates. Whether or not soft combining is to be performed at the time of reception, depends on the implementation of the user equipment 100.

For example, as illustrated in FIG. 9, the user equipment 100 on the transmitting side transmits Beam 1 to Beam 4. In this case, information indicating that four continuous (consecutive) beam resources are bundled in the time domain as illustrated in FIG. 9, is included in SA or upper layer signaling included in the resource indication (report) received by the user equipment 100 on the receiving side from the user equipment 100 on the transmitting side. The four bundled beam resources correspond to Beam 1 to Beam 4, respectively. The beam resources are bundled and indicated (reported), and, therefore, the overhead associated with the resource indication (report) is reduced as compared with the case where the beam resources are individually indicated (reported).

Figure 10:
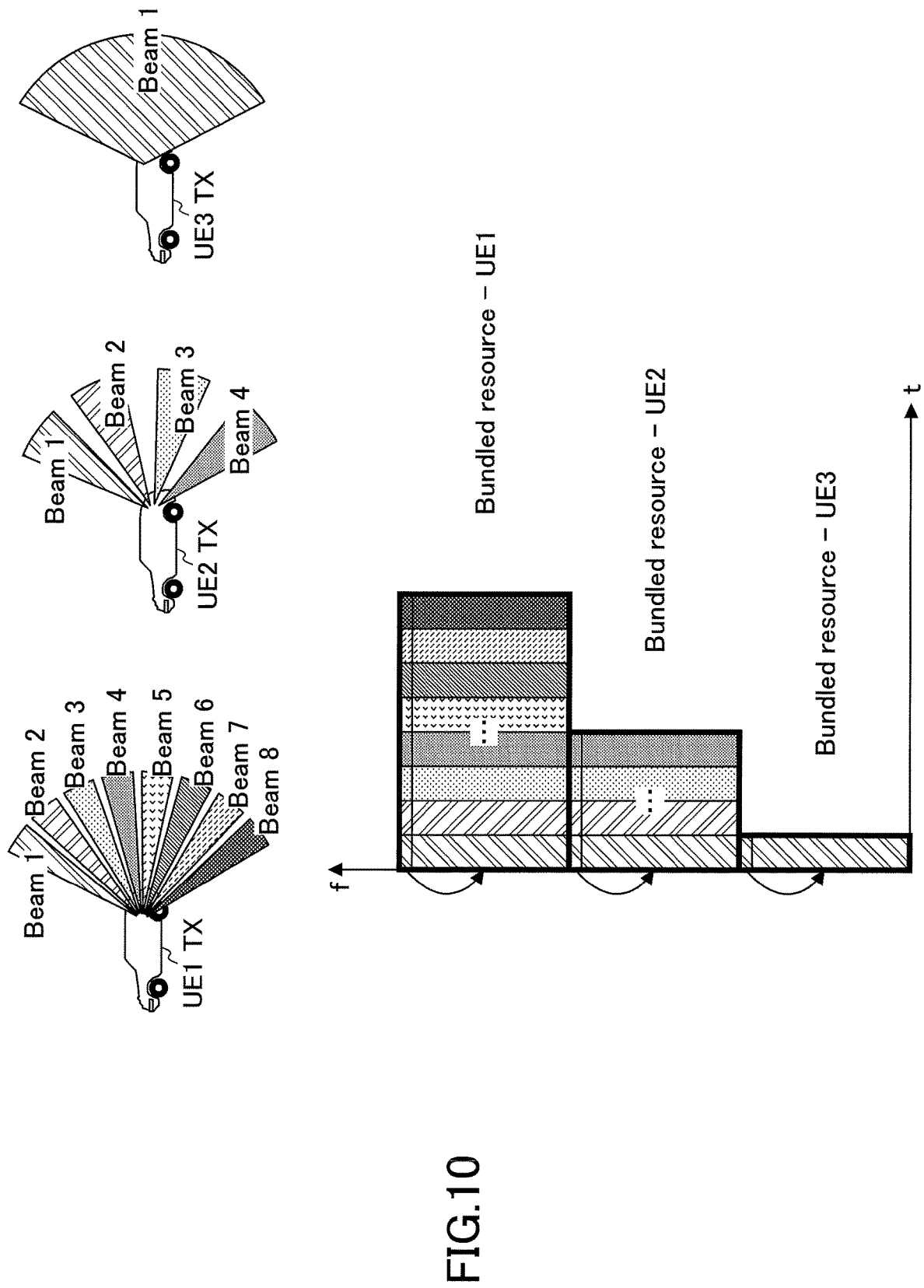
FIG. 10 is a diagram illustrating an example (5) of a resource indication (report) according to the embodiment of the present invention.

FIG. 10 is a diagram illustrating an example (5) of a resource indication (report) according to the embodiment of the present invention. The number of bundled beam resources is indicated (reported) from the user equipment 100 on the transmitting side to the user equipment 100 on the receiving side. The absolute position of the recommended beam resource is indicated (reported) from the user equipment 100 on the transmitting side to the user equipment 100 on the receiving side and is decoded. The additional bit indicates, for example, that the "k"th beam resource, among the bundled beam resources, is the recommended beam resource. The additional bit is used by the user equipment 100 on the receiving side to acquire the absolute position in the bitmap covering the resource region in the time domain and the frequency domain.

The recommended beam resource to be decoded may be indicated (reported) by SA to the user equipment 100 on the receiving side. For example, the number of bundled beam resources and the index indicating the position of the recommended beam resource are indicated (reported) to the user equipment 100 on the receiving side by SA or upper layer signaling. If the above information is included in SA, the maximum number of bundled beam resources may be predefined. If the above information is included in the upper layer signaling, the maximum number of fields may be predefined, configured, or indicated (reported).

As illustrated in FIG. 10, the UE1 transmits Beam 1 to Beam 8, the number of bundled beam resources is 8, and the recommended beam resource is Beam 1. Therefore, the resource indication (report) transmitted from the UE1 includes information indicating that the number of bundled beam resources is 8 and that the recommended beam resource is the first beam resource. The UE2 transmits Beam 1 to Beam 4, the number of bundled beam resources is 4, and the recommended beam resource is Beam 1. Therefore, the resource indication (report) transmitted from the UE2 includes information indicating that the number of bundled beam resources is 4 and that the recommended beam resource is the first beam resource. The UE3 transmits Beam 1 and the number of beam resources is 1; however, one beam resource may be defined as a bundled beam resource.

Figure 11:
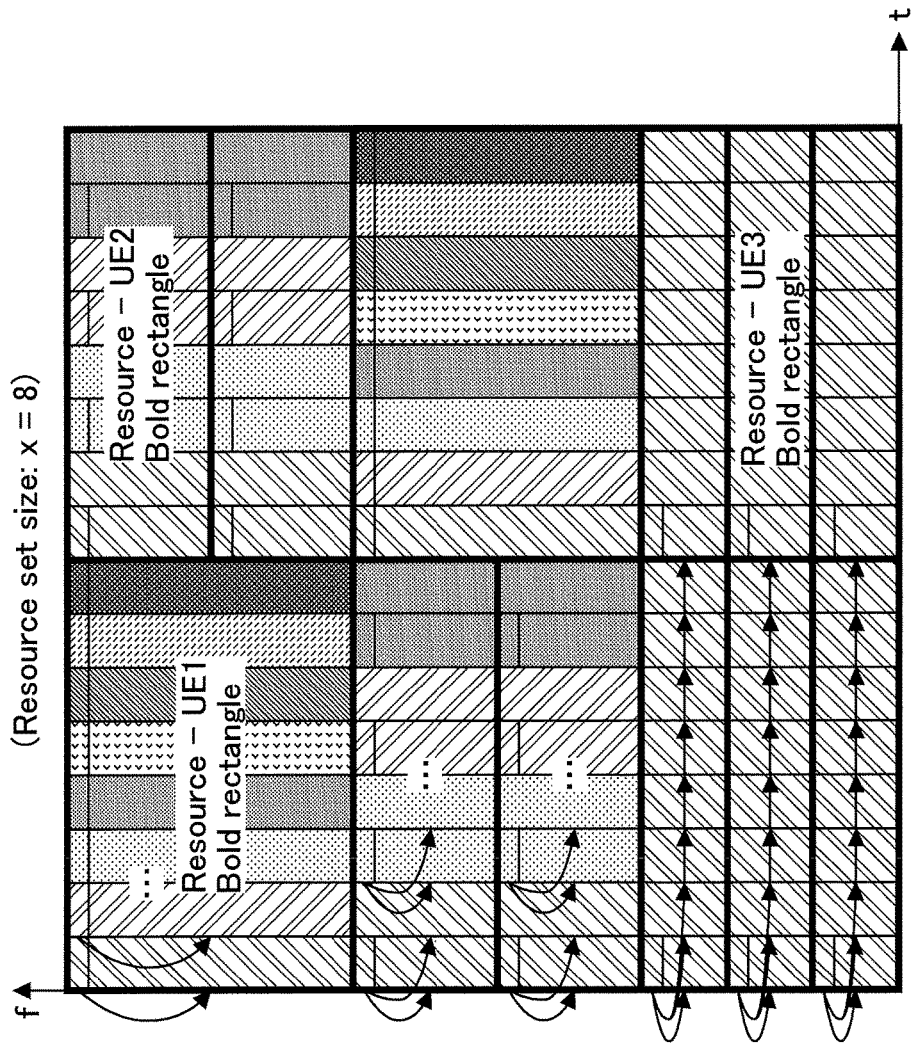
FIG. 11 is a diagram illustrating an example (6) of a resource indication (report) according to the embodiment of the present invention.

FIG. 11 is a diagram illustrating an example (6) of a resource indication (report) according to the embodiment of the present invention. The set of bundled beam resources is predefined or configured. The size of the set may be predefined or configured, for example, by the number of TTIs. For the set of bundled beam resources, a logical index of the time domain may be predefined or configured. The logical index of the time domain may be defined, for example, by a boundary according to floor (DFN/x). DFN (D2D reference number) is a frame number in D2D communication. By defining the logical index of the time domain, it becomes possible to arrange the set of beam resources to be aligned at the boundary of the radio frame, thereby making it easy to recognize the position of the set of beam resources by the user equipment 100 on the receiving side.

The user equipment 100 on the transmitting side indicates (reports), to the user equipment 100 on the receiving side, the absolute position of the recommended beam resource to be decoded. The indication (report) may include information indicating the frequency domain and/or time domain of the recommended beam resource.

When the user equipment 100 on the receiving side detects that a certain beam resource is occupied, among the set of bundled beam resources, it may be regarded that all of the beam resources included in the set of bundled beam resources are occupied. For example, if the maximum RSRP or RSSI of a certain beam resource, among the beam resources included in the set of bundled beam resources, exceeds a threshold value, it is determined that all of the beam resources included in the set of bundled beam resources are occupied.

As illustrated in the left diagram of FIG. 11, the size of the set of beam resources is 8. The UE1, the UE2, and the UE3 transmit beams as illustrated in FIG. 10. The set of bundled beam resources of the UE1 includes one set including eight beam resources. The sets of bundled beam resources of UE2 include two sets, each set including four beam resources. The sets of bundled beam resources of UE3 include eight sets, each set including one beam resource. The arrows in the figure indicate SA and corresponding resources. As illustrated in the right diagram of FIG. 11, when one beam resource is occupied among the set of bundled beam resources, it is regarded by the user equipment 100 on the receiving side that all of the beam resources in the set of bundled beam resources are occupied.

Figure 12:
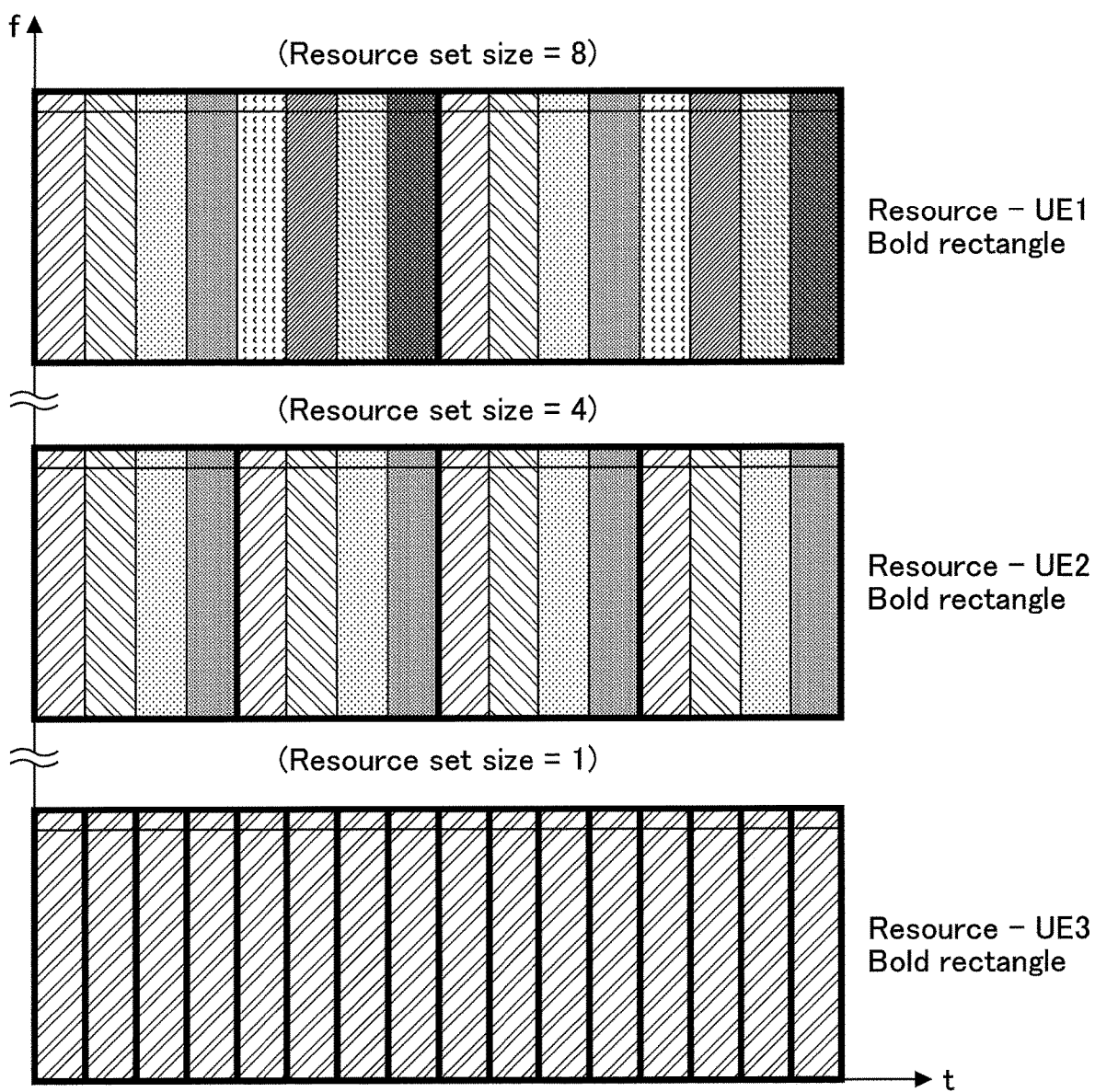
FIG. 12 is a diagram illustrating an example (7) of a resource indication (report) according to the embodiment of the present invention.

FIG. 12 is a diagram illustrating an example (7) of a resource indication (report) according to the embodiment of the present invention. As an example in which a set of bundled beam resources is predefined or configured, in FIG. 12, sets of beam resources to which the same radio parameter is applied, are illustrated. The UE1, the UE2, and the UE3 transmit beams as illustrated in FIG. 10.

The size of the set of beam resources of the UE1 is 8, and 2 sets are arranged. The size of the set of beam resources of UE2 is 4, and 4 sets are arranged. The size of the set of beam resources of the UE3 is 1, and 16 sets are arranged. As illustrated in FIG. 12, the regions, indicated by the frequency domain and the time domain per beam resource, are the same.

Figure 13:
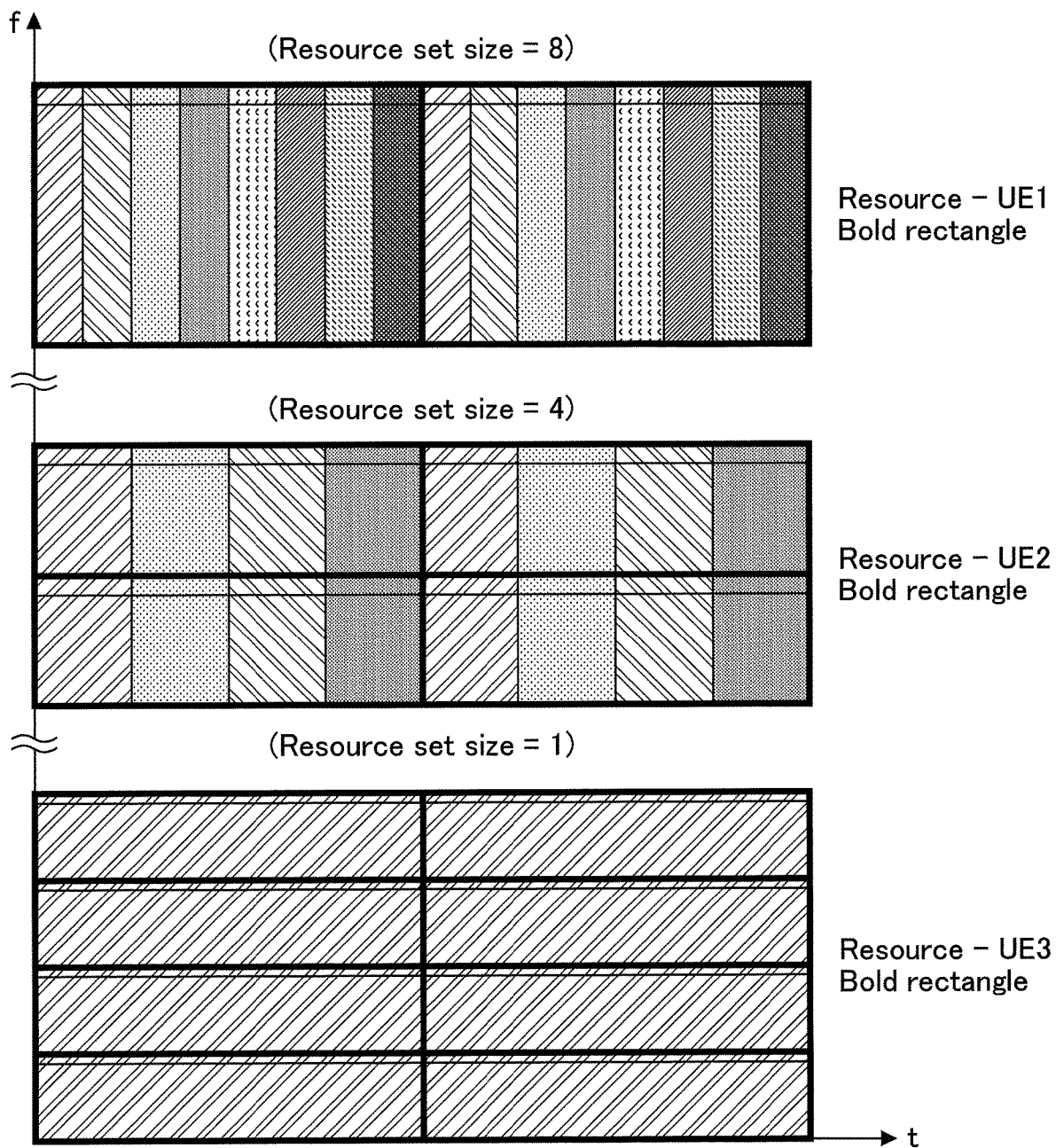
FIG. 13 is a diagram illustrating an example (8) of a resource indication (report) according to the embodiment of the present invention.

FIG. 13 is a diagram illustrating an example (8) of a resource indication (report) according to the embodiment of the present invention. As an example where a set of bundled beam resources is predefined or configured, in FIG. 13, sets of beam resources to which different radio parameters are applied, are illustrated. The UE1, the UE2, and the UE3 transmit beams as illustrated in FIG. 10.

The size of the set of beam resources of the UE1 is 8, and 2 sets are arranged. The size of the set of beam resources of UE2 is 4, and 4 sets are arranged. The beam resource of the UE2 is a resource in which the beam resource of the UE1 is doubled in the time domain and halved in the frequency domain. The size of the set of beam resources of the UE3 is 1, and 8 sets are arranged. The beam resource of the UE3 is a resource in which the beam resource of the UE1 is set to 8 times in the time domain and ¼ in the frequency domain. As illustrated in FIG. 13, the regions indicated by the frequency domain and time domain per beam resource are different.

FIG. 14 is a diagram for describing the features of the resource indicating (reporting) methods according to the embodiment of the present invention. As illustrated in FIG. 14, the resource indicating (reporting) method illustrated in FIG. 10 has the feature that the flexibility of resource selection is high and the signaling overhead is high. The resource indicating (reporting) method illustrated in FIG. 11 has the feature that the flexibility of resource selection is limited, and when compared with the resource indicating (reporting) method illustrated in FIG. 10, the signaling overhead is low. The indicating (reporting) methods illustrated in FIG. 12 or 13 have the feature that the flexibility of resource selection is limited and the resource indication (report) related to the time domain is reduced, so that the signaling overhead is lower than the resource indicating (reporting) method illustrated in FIG. 11.

Hereinafter, decoding according to the embodiment of the present invention will be described.

In data transmission using a plurality of beam resources, a fixed RV (Redundancy Version) pattern is predefined or configured. For example, the predefined fixed RV pattern is configured by sequentially changing the RV from the minimum index to the maximum index related to the time and/or frequency of the beam resources. On the other hand, if data transmission is performed by beam repetition, the same RV is used.

It is predefined or configured that the user equipment 100 on the receiving side decodes the recommended beam resource to acquire data. Whether or not soft combining is performed on all of the beam resources depends on the implementation of the user equipment 100. The RV of the data transmission of the recommended beam resource may be explicitly indicated (reported) or implicitly derived from predetermined or configured information relating to the resource indication (report). Note that beam forming may be performed in the user equipment 100 on the receiving side. In the case where beam forming is performed in the user equipment 100 on the receiving side, for example, control is implemented such that the antenna panel is directed to a stronger beam.

Figure 15:
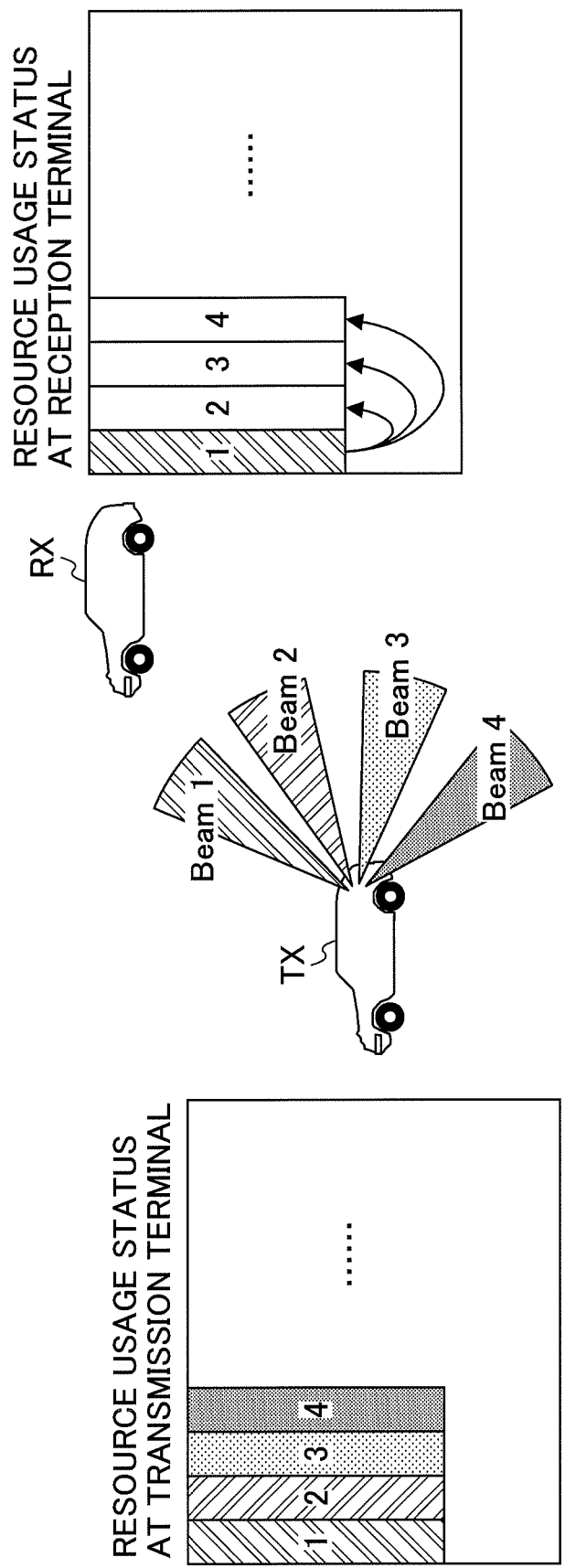
FIG. 15 is a diagram for describing a method of measuring reception power according to an embodiment of the present invention.

FIG. 15 is a diagram for describing a method of measuring reception power according to the embodiment of the present invention.

A method of calculating RSRP for antenna panels directed in specific directions is configured or predefined. The user equipment 100 on the receiving side receives a certain beam from the user equipment 100 on the transmitting side and decodes the received beam, and identifies all of the beam resources occupied by the user equipment 100 on the transmitting side. The user equipment 100 on the receiving side measures the RSRP of the beam resource to be decoded. A plurality of beam resources may be decoded. The highest RSRP value may represent an estimated RSRP of all of the beam resources occupied by the user equipment 100 on the transmitting side.

For example, exclusion of a resource from resource candidates is configured or predefined, based on an estimated RSRP calculated independently for each of the antenna panels directed in different directions, in front, rear, right, and left directions.

As illustrated in FIG. 15, the user equipment 100 on the transmitting side transmits Beam 1 to Beam 4, and occupies the beam resources 1 to 4. The user equipment 100 on the receiving side decodes the beam resource 1 and measures the RSRP of the beam resource 1. The RSRP of the beam resource 1 may represent RSRP of the beam resource 2, the beam resource 3, and the beam resource 4.

Figure 16:
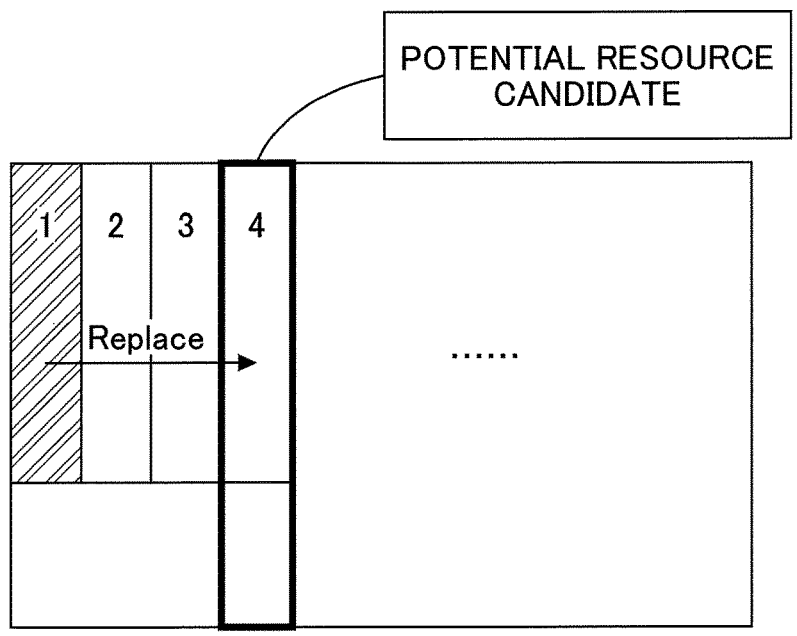
FIG. 16 is a diagram for describing a method (1) of measuring the reception signal strength according to an embodiment of the present invention.

FIG. 16 is a diagram for describing a method (1) for measuring the reception signal strength according to the embodiment of the present invention. A method of calculating the RSSI for antenna panels directed in specific directions is configured or predefined. In the case where a potential beam resource candidate overlaps with a plurality of beam resources recognized by the user equipment 100 on the receiving side as belonging to beam resources occupied by a certain user equipment 100 on the transmitting side, the power of the beam resource having the highest RSRP is replaced with the power of the overlapping beam resource, and the RSSI is calculated. The beam resources occupied by the user equipment 100 on the transmitting side are recognized by the user equipment 100 on the receiving side, based on the information included in the resource arrangement field obtained by decoding.

In FIG. 16, it is assumed that RSRP of beam resource 1 is higher than that of the beam resource 2, the beam resource 3, and the beam resource 4. The potential beam resource candidate is the region surrounded by a thick black frame. A part of this region overlaps with the beam resource 4. The power of the beam resource 1 is replaced with the power of the beam resource 4, and the RSSI is calculated.

Figure 17:
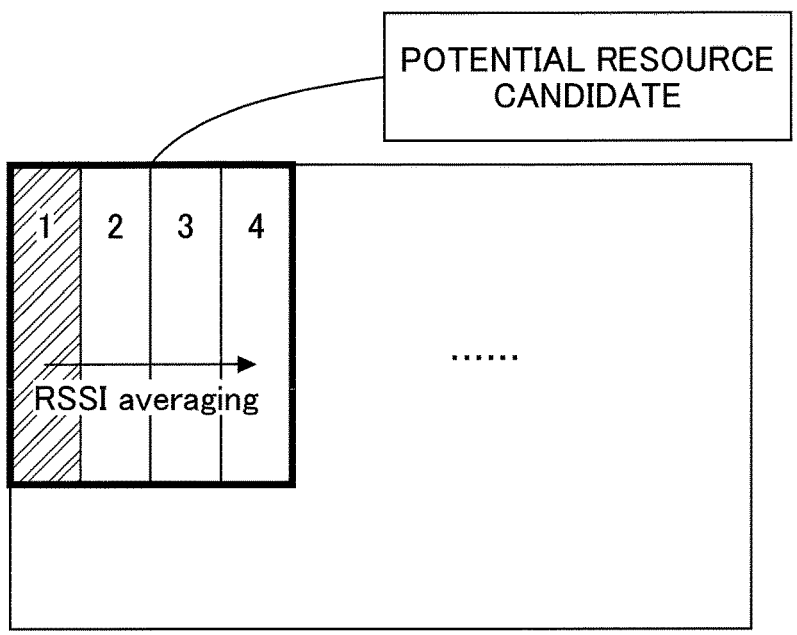
FIG. 17 is a diagram for describing a method (2) of measuring the reception signal strength according to an embodiment of the present invention.

FIG. 17 is a diagram for describing the method (2) for measuring the reception signal strength according to the embodiment of the present invention. As illustrated in FIG. 17, the RSSI of the set of bundled beam resources may be defined by an average RSSI of all of the beam resources of the set of bundled beam resources. In the case illustrated in FIG. 17, the potential beam resource candidate is a region surrounded by a thick black frame, which coincides with the set of beam resource 1 to beam resource 4.

Figure 18:
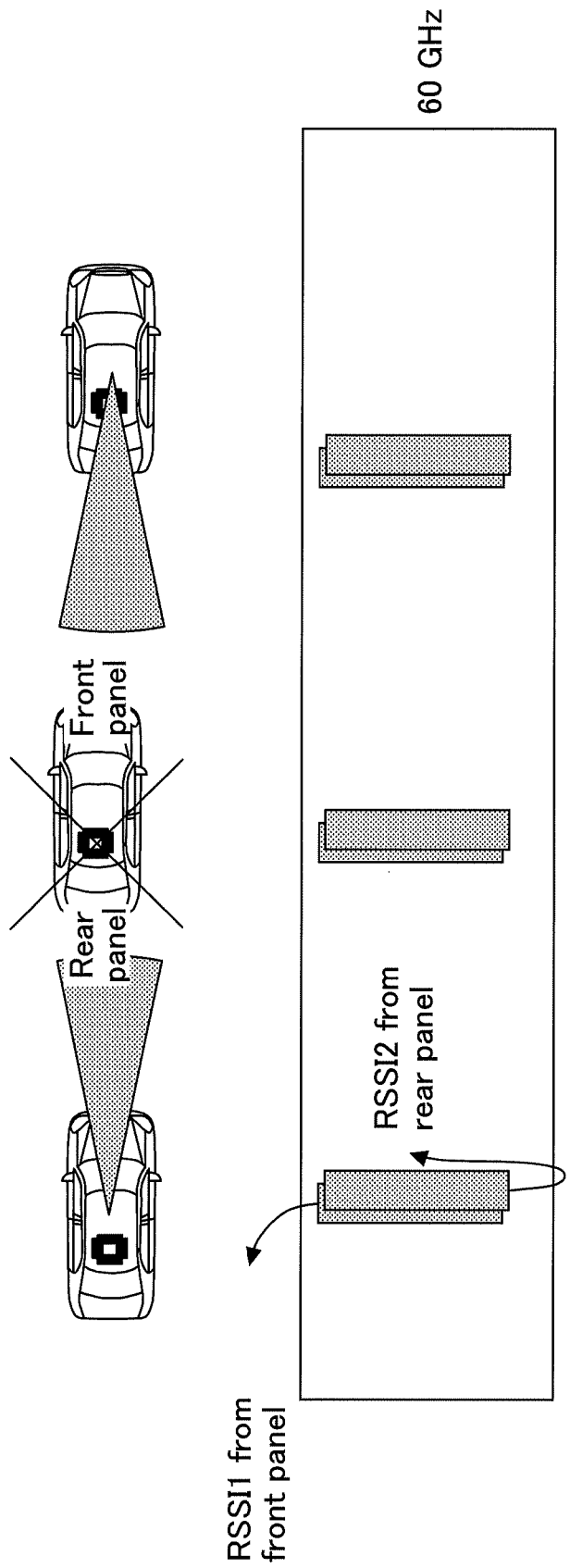
FIG. 18 is a diagram for describing a method (3) of measuring the reception signal strength according to an embodiment of the present invention.

FIG. 18 is a diagram for describing the method (3) for measuring the reception signal strength according to the embodiment of the present invention. Hereinafter, averaging of the RSSI will be described. Whether or not to use the same antenna pattern for sensing, for each antenna panel in the user equipment 100 having a plurality of antenna panels, depends on a configuration or the implementation of the user equipment 100. For example, with respect to sensing, and an antenna pattern covering a range of the maximum angle of the antenna panel for sensing, a single antenna element is assumed.

The final RSSI of the potential resource candidate is configured or predefined to be obtained as the average RSSI of the antenna panels directed in all directions.

FIG. 18 illustrates an example of averaging the RSSI measured on the front antenna panel and the rear antenna panel in the 60 GHz band. RSSI1 is the RSSI measured on the front antenna panel and RSSI2 is the RSSI measured on the rear antenna panel. The final RSSI of the potential resource candidate is calculated as (RSSI1+RSSI2)/2. That is, assuming that the number of antenna panels, for which RSSI is averaged, is N, and $RSSI_n$ is the RSSI measured on the nth antenna panel, the final RSSI is calculated by the following formula 1.

$$RSSI = \frac{1}{N} \sum_{n=1}^{N} RSSI_n \qquad \text{[Formula 1]}$$

In the above embodiment, the user equipment 100 indicates (reports) a plurality of resources used for transmission by beam switching, so that the neighboring user equipment 100 can acquire information relating to an occupied resource other than the resource of the decoded beam, and, therefore, the possibility of resource collision is reduced. Furthermore, by applying reception beamforming in addition to repetitive beam transmission and transmission beamforming, sensing is performed in a relatively wide range using strong beams, thereby improving the possibility of receiving sensing signals. Therefore, it is possible to reduce the possibility of resource collision caused by a hidden node, when selecting a resource. Furthermore, the possibility of resource collision is reduced, and, therefore, the problem that the communication becomes half duplex between the user equipments 100 is alleviated.

That is, in D2D, the user equipment that performs the transmission by applying the beamforming can appropriately select the resource to be used.

Device Configuration

Next, a functional configuration example of the user equipment 100 that executes the processes and operations described above will be described. The user equipment 100 includes functions for implementing at least the examples. However, the user equipment 100 may have only some of the functions of the examples.

Figure 19:
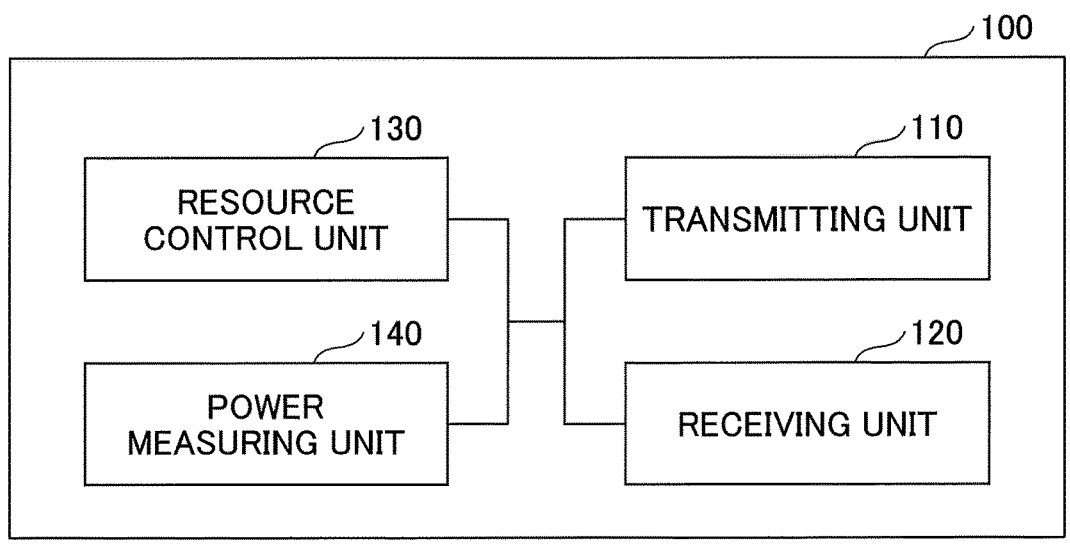
FIG. 19 is a diagram illustrating an example of a functional configuration of the user equipment 100 according to an embodiment of the present invention.

FIG. 19 is a diagram illustrating an example of a functional configuration of the user equipment 100. As illustrated in FIG. 19, the user equipment 100 includes a transmitting unit 110, a receiving unit 120, a resource control unit 130, and a power measuring unit 140. The functional configuration illustrated in FIG. 19 is merely an example. As long as the operations according to the embodiment of the present invention can be executed, the functional sections and the names of the functional units may be any section or name.

The transmitting unit 110 creates transmission signals from transmission data and wirelessly transmits the transmission signals. The receiving unit 120 wirelessly receives various signals and acquires signals of an upper layer from the received signals of the physical layer. Furthermore, the receiving unit 120 has a function of receiving synchronization signals, control signals, data, etc., transmitted from the user equipment 100. Furthermore, the transmitting unit 110 transmits data or control signals to another user equipment 100, and the receiving unit 120 receives data or control signals from another user equipment 100. Furthermore, the transmitting unit 110 may perform transmission by applying beamforming.

As described in the examples, the resource control unit 130 selects a resource to be used for transmission, based on information detected by sensing by the receiving unit 120. Furthermore, the resource control unit 130 acquires explicit information for selecting a resource included in the sensing signals.

As described in the examples, the power measuring unit 140 performs control related to measurement of the reception signal power, reception signal strength, etc., in the user equipment 100. Note that a functional unit related to signal transmission, etc., in the resource control unit 130 or the power measuring unit 140, may be included in the transmitting unit 110, and a functional unit related to signal reception, etc., in the resource control unit 130 or the power measuring unit 140, may be included in the receiving unit 120.

Hardware Configuration

The functional configuration diagram (FIG. 19) used for describing the embodiment of the present invention described above is of blocks of functional units. These functional blocks (constituent units) are implemented by any combination of hardware and/or software. Means for implementing each functional block is not particularly limited. That is, each functional block may be implemented by one device in which a plurality of elements are physically and/or logically combined, or two or more devices physically and/or logically separated may be directly and/or indirectly (for example, in a wired and/or wireless manner) connected to each other, and each functional block may be implemented by these plural devices.

Figure 20:
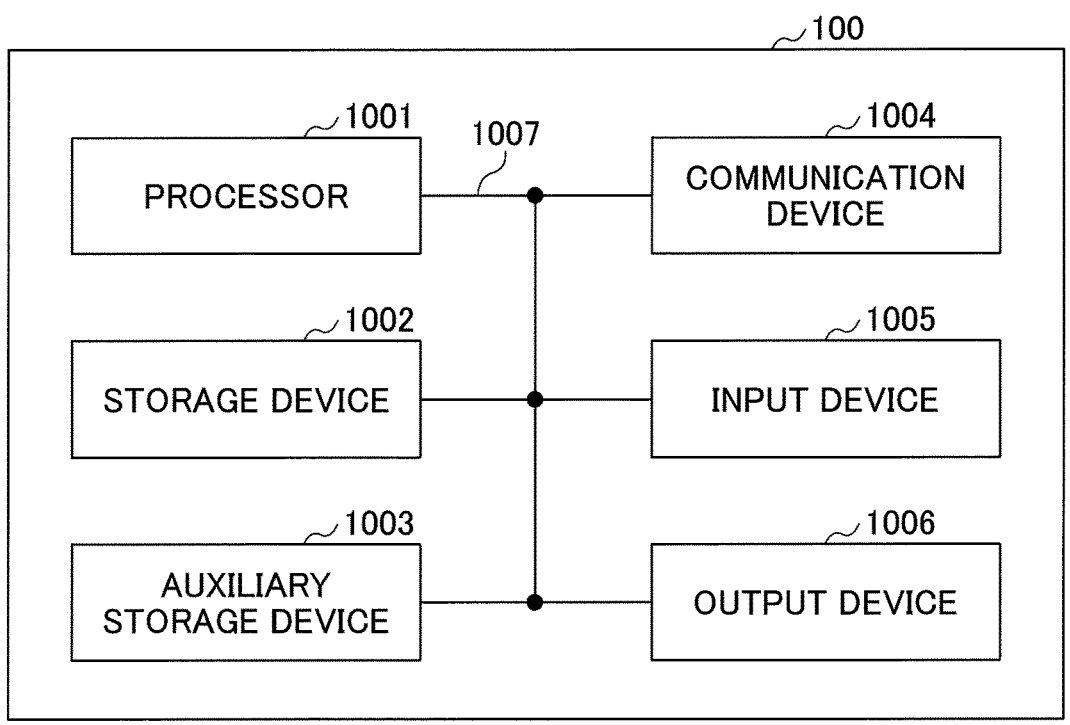
FIG. 20 is a diagram illustrating an example of a hardware configuration of the user equipment 100 according to an embodiment of the present invention.

Furthermore, for example, any of the user equipments 100 according to the embodiment of the present invention may function as a computer that performs processes according to the embodiment of the present invention. FIG. 20 is a diagram illustrating an example of a hardware configuration of the user equipment 100 according to the embodiment of the present invention. The user equipment 100 described above may be formed as a computer apparatus physically including a processor 1001, a storage device 1002, an auxiliary storage device 1003, a communication device 1004, an input device 1005, an output device 1006, a bus 1007, etc.

Note that in the following description, the term "device" can be read as a circuit, a device, a unit, etc. The hardware configuration of the user equipment 100 may be configured to include one or a plurality of devices denoted by 1001 to 1006 illustrated in the figure, or may be configured to not include some of the devices.

The functions of the user equipment 100 are implemented by loading predetermined software (program) in hardware such as the processor 1001 and the storage device 1002, computing by the processor 1001, communicating by the communication device 1004, and controlling the reading and/or writing of data in the storage device 1002 and the auxiliary storage device 1003.

The processor 1001 operates, for example, the operating system to control the entire computer. The processor 1001 may be formed of a central processing unit (CPU) including an interface with a peripheral device, a control device, an arithmetic device, and a register, etc.

Furthermore, the processor 1001 loads a program (program code), a software module, or data from the auxiliary storage device 1003 and/or the communication device 1004, into the storage device 1002, and executes various processes according to the program, the software module, or the data. As the program, a program for causing a computer to execute at least part of the operations described in the above embodiment is used. For example, the transmitting unit 110, the receiving unit 120, the resource control unit 130, and the power measuring unit 140 of the user equipment 100 illustrated in FIG. 19 may be implemented by a control program stored in the storage device 1002 and operating on the processor 1001. Although it has been described that the above-described various processes are executed by one processor 1001, the processes may be executed simultaneously or sequentially by two or more processors 1001. The processor 1001 may be implemented with one or more chips. Note that the program may be transmitted from the network via an electric communication line.

The storage device 1002 is a computer-readable recording medium and may be formed of at least one of a ROM (Read Only Memory), an EPROM (Erasable Programmable ROM), an EEPROM (Electrically Erasable Programmable ROM), and a RAM (Random Access Memory). The storage device 1002 may be referred to as a register, a cache, and a main memory, etc. The storage device 1002 can store executable programs (program codes), software modules, etc., for implementing the process according to the embodiment of the present invention.

The auxiliary storage device 1003 is a computer-readable recording medium, and may be formed of, for example, at least one of an optical disk such as a CD-ROM (Compact Disc ROM), a hard disk drive, a flexible disk, a magneto-optical disk (for example, a compact disk, a digital versatile disk, and a Blu-ray (registered trademark) disk), a smart card, a flash memory (for example, a card, a stick, and a key drive), a floppy (registered trademark) disk, and a magnetic strip, etc. The auxiliary storage device 1003 may be referred to as a secondary storage device. The above-described storage medium may be, for example, a database including the storage device 1002 and/or the auxiliary storage device 1003, a server, or another appropriate medium.

The communication device 1004 is hardware (transmission/reception device) for performing communication between computers via a wired and/or wireless network, and is also referred to as a network device, a network controller, a network card, and a communication module, etc., for example. For example, the transmitting unit 110 and the receiving unit 120 of the user equipment 100 may be implemented by the communication device 1004.

The input device 1005 is an input device (for example, a keyboard, a mouse, a microphone, a switch, a button, and a sensor, etc.) that accepts input from the outside. The output device 1006 is an output device (for example, a display, a speaker, and an LED lamp, etc.) that performs output to the outside. Note that the input device 1005 and the output device 1006 may be integrated (for example, a touch panel).

Furthermore, the respective devices such as the processor 1001 and the storage device 1002 are connected by a bus 1007 for communicating information. The bus 1007 may be formed of a single bus or may be formed of different buses between the devices.

Furthermore, the user equipment 100 may include hardware such as a microprocessor, a digital signal processor (DSP), an application specific integrated circuit (ASIC), a programmable logic device (PLD), and a field programmable gate array (FPGA), and a part of or all of the functional blocks may be implemented by the hardware. For example, the processor 1001 may be implemented with at least one of these hardware elements.

Overview of Embodiment

As described above, according to the embodiment of the present invention, there is provided a user equipment for performing communication using beamforming with another user equipment, the user equipment including a control unit configured to configure, in at least one beam among a plurality of beams, information indicating positions of all of resources in a radio frame, the plurality of beams being transmitted via corresponding resources; and a transmitting unit configured to transmit the plurality of beams using all of the resources, by applying beam switching or beam repetition, wherein the positions of all of the resources in the radio frame correspond to a position of a resource to be decoded and a position to be used for excluding a transmission resource candidate.

With the above configuration, the user equipment can indicate (report) the plurality of resources used for transmission, so that the neighboring user equipment can acquire information on the occupied resources other than the resource of the decoded beam, and, therefore, the possibility of resource collision is reduced. Thus, in D2D, the user equipment, which performs transmission by applying beamforming, can appropriately select the resource to be used.

The position of the resource to be decoded may be indicated (reported) via physical layer signaling, and the position to be used for excluding the transmission resource candidate may be indicated (reported) via upper layer signaling. With this configuration, the user equipment can transmit/receive a plurality of resources used for transmission, in an appropriate layer according to the type of the resource.

The position in the radio frame including all of the resources may be indicated (reported), based on a resource usage status per resource in a bitmap defined by a time domain and a frequency domain, or based on a resource arrangement pattern encoded per TTI in the bitmap. With this configuration, the user equipment can acquire information on the occupied resources other than the resource of the decoded beam, so the possibility of resource collision is reduced.

In a case where all of the resources continuous in a time domain are bundled and the position in the radio frame is indicated (reported), and any resource among all of the resources is received, all of the bundled resources may be used for excluding the transmission resource candidate. With this configuration, the user equipment can reduce the signaling overhead associated with resource indication (report), by bundling resources.

An index defined by a time domain and a frequency domain may be applied to all of the resources, and a pattern, associating the index with a redundancy version of each of all of the resources having the index, may be predefined. With this configuration, by preliminarily defining an RV pattern to be allocated to a resource, the user equipment can obtain a gain when decoding the resource.

A receiving unit configured to receive a plurality of beams by applying reception side beam forming on the plurality of beams to be received; and a measuring unit configured to measure a reception signal strength for each of a plurality of antenna panels used for the reception side beam forming, may be further included, wherein an average reception signal strength among the plurality of antenna panels may be calculated by averaging the reception signal strength measured for each of the plurality of antenna panels. With this configuration, the area in which beams can be received is expanded, and the possibility that the user equipment can acquire the information on the occupied resource is increased, so the possibility of resource collision is reduced.

Supplement of Embodiment

The embodiment of the present invention is described above; however the disclosed invention is not limited to the embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. The order of the processes in each of the processing procedures described in in the embodiment may be re-arranged, provided that they do not contradict. For the convenience of description, the user equipment 100 is described by using the functional block diagrams; however, such devices may be implemented in hardware, software, or combinations thereof. The software to be executed by the processor included in the user equipment 100 in accordance with the embodiment of the present invention and the software to be executed by the processor included in the user equipment 100 may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

Furthermore, indication (report) of information is not limited to the aspect/embodiment described in the present specification and may be performed by other methods. For example, indication (report) of information may be performed via physical layer signaling (for example, Downlink Control Information (DCI) or Uplink Control Information (UCI)), upper-layer signaling (for example, RRC (Radio Resource Control) signaling, MAC (Medium Access Control) signaling, broadcast information (Master Information Block (MIB), or System Information Block (SIB))), other signals, or by a combination thereof. Moreover, an RRC message may be referred to as the RRC signaling. Furthermore, RRC signaling may be referred to as the RRC message, and may be an RRC connection setup (RRC Connection Setup) message, a RRC connection reconfiguration (RRC Connection Reconfiguration) message, etc., for example.

Furthermore, each aspect/embodiment described in this specification can be applied to long term evolution (LTE), LTE-advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wideband (UWB), Bluetooth (registered trademark), any other systems using an appropriate system and/or next generation systems expanded on the basis of these systems.

Furthermore, processing procedures, sequences, flowcharts, etc., of each embodiment/modified example described in the specification may be exchanged as long as there is no inconsistency. For example, for the methods described in the specification, the elements of the various steps are presented in an exemplary order and are not limited to a specific order presented.

The user equipment 100 may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or any other appropriate terminologies.

The terms "determining" and "deciding" used in this specification may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least".

As long as the terminologies "include", "including" and variations thereof are used in the present specification or claims, these terminologies are intended to be inclusive similar to the terminology "comprising". Furthermore, the terminology "or" as used in the present specification or claims is intended not to be an exclusive OR.

In the entire present disclosure, for example, if articles are added by translation, such as a, an, and the in English, these articles may indicate plurality, unless it is clearly indicated from the context that these articles do not indicate plurality.

Note that according to the embodiment of the present invention, the beam resource is an example of a resource. The resource control unit 130 is an example of a control unit. The power measuring unit 140 is an example of a measuring unit. A resource candidate used for data communication is an example of a transmission resource candidate.

Although the present invention has been described in detail, it is apparent to those skilled in the art that the present invention is not limited to the embodiments as described in the present specification. The present invention can be implemented as modifications and variations without departing from the sprit and scope of the present invention as defined in claims. Thus, the description in the present specification is intended for exemplary description and does not mean any limitation to the present invention.

REFERENCE SIGNS LIST

100 user equipment
110 transmitting unit
120 receiving unit
130 resource control unit
140 power measuring unit
1001 processor
1002 storage device
1003 auxiliary storage device
1004 communication device
1005 input device
1006 output device

The invention claimed is:

1. A user equipment for performing communication using beamforming with another user equipment, the user equipment comprising:
   a control unit configured to configure, in at least one beam among a plurality of beams, information indicating positions of all of resources in a radio frame, the plurality of beams being transmitted via corresponding resources; and
   a transmitting unit configured to transmit the plurality of beams using all of the resources, by applying beam switching or beam repetition, wherein
   the positions of all of the resources in the radio frame correspond to a position of a resource to be decoded and a position to be used for excluding a transmission resource candidate.

2. The user equipment according to claim 1, wherein
   the position of the resource to be decoded is transmitted via physical layer signaling, and
   the position to be used for excluding the transmission resource candidate is transmitted via upper layer signaling.

3. The user equipment according to claim 1, wherein the positions of all of the resources in the radio frame are indicated based on a resource usage status per resource in a bitmap defined by a time domain and a frequency domain, or based on a resource arrangement pattern encoded per transmission time interval (TTI) in the bitmap.

4. The user equipment according to claim 1, wherein, in a case where all of the resources contiguous in a time domain are bundled and the positions in the radio frame are indicated, and any resource among all of the resources is received, all of the bundled resources are used for excluding the transmission resource candidate.

5. The user equipment according to claim 1, wherein,
   an index defined by a time domain and a frequency domain is applied to all of the resources, and
   a pattern, associating the index with a redundancy version of each of all of the resources having the index, is predefined.

6. The user equipment according to claim 1, further comprising:
   a receiving unit configured to receive a plurality of beams by applying reception side beam forming on the plurality of beams to be received; and
   a measuring unit configured to measure a reception signal strength for each of a plurality of antenna panels used for the reception side beam forming, wherein
   an average reception signal strength among the plurality of antenna panels is calculated by averaging the reception signal strength measured for each of the plurality of antenna panels.

* * * * *